(12) United States Patent
Nakamura

(10) Patent No.: US 7,055,800 B2
(45) Date of Patent: Jun. 6, 2006

(54) FLOW RATE CONTROL VALVE

(75) Inventor: Katsumi Nakamura, Toyota (JP)

(73) Assignee: Taiho Kogyo Co., Ltd., Toyota (JP)

( * ) Notice: Subject to any disclaimer, the term of this patent is extended or adjusted under 35 U.S.C. 154(b) by 0 days.

(21) Appl. No.: 10/544,247

(22) PCT Filed: Feb. 13, 2004

(86) PCT No.: PCT/JP2004/001523

§ 371 (c)(1),
(2), (4) Date: Aug. 2, 2005

(87) PCT Pub. No.: WO2004/072518

PCT Pub. Date: Aug. 26, 2004

(65) Prior Publication Data

US 2006/0038151 A1 Feb. 23, 2006

(30) Foreign Application Priority Data

Feb. 13, 2003 (JP) .............................. 2003-034664

(51) Int. Cl.
*F16K 1/226* (2006.01)
(52) U.S. Cl. ...................... 251/305; 123/337
(58) Field of Classification Search ................ 251/305, 251/306, 307, 308; 123/337
See application file for complete search history.

(56) References Cited

U.S. PATENT DOCUMENTS

| | | | | |
|---|---|---|---|---|
| 5,979,871 A | * | 11/1999 | Forbes et al. ................ | 251/305 |
| 5,979,872 A | * | 11/1999 | Stearns et al. ............... | 251/305 |
| 6,193,214 B1 | * | 2/2001 | Schatz ......................... | 251/305 |
| 6,338,467 B1 | | 1/2002 | Mabboux et al. | |

FOREIGN PATENT DOCUMENTS

| | | |
|---|---|---|
| JP | 54-90523 | 12/1952 |
| JP | 61-24766 | 7/1986 |
| JP | 07-151243 | 6/1995 |
| JP | 07-332541 | 12/1995 |
| JP | 09-329028 | 12/1997 |
| JP | 2001-004038 | 1/2001 |
| JP | 2002-54512 | 2/2002 |

* cited by examiner

*Primary Examiner*—John Bastianelli
(74) *Attorney, Agent, or Firm*—Flynn, Thiel, Boutell & Tanis, P.C.

(57) ABSTRACT

A flow rate control valve 1 comprises a first sleeve 4 and a second sleeve 5 fitted into an inner periphery of a housing 3. The both sleeves 4 and 5 have inner end faces 4*d* and 5*d* which are disposed in abutment against each other while being displaced from each other radially, thereby forming annular stepped end faces 4*d'* and 5*d'* on a common plane. An edge of the stepped end faces define a first seat S1. The valve body 6 has an outer peripheral surface which is formed as a beveled surface, which defines a second seat S2. The second seat S2 of the valve body 6 is disposed in linear contact with the first seat S1 to close a flow path in a gas passage 2.

With this arrangement, a seal leakage when a butterfly valve 7 is closed can be reduced in comparison to the prior art.

4 Claims, 6 Drawing Sheets

FLOW RATE CONTROL VALVE

TECHNICAL FIELD

The present invention relates to a flow rate control valve which is preferred for use in an exhaust gas recirculation apparatus (EGR), and more particularly, to an improvement of a valve body thereof and associated parts.

BACKGROUND ART

An exhaust gas recirculation apparatus (EGR) is known in the art which is disposed in a gas passage communicating between an air supply pipe and an exhaust pipe of an engine for an automobile to open or close the gas passage as required. To serve as a flow rate control valve for such EGR, one constructed as a poppet valve type is known (for example, see Japanese Laid-Open Patent Application No. 2002-54512).

A flow rate control valve for an exhaust brake unit is also known in the art which is of a butterfly valve type (see Japanese Laid-Open Utility Model Application No. 90523/1979 and Laid-Open Patent Application No. 151243/1995, for example), and is constructed as follows: in the arrangement of above Utility Model Application No. 90523/1979, a flow path in the exhaust pipe is formed at a given position with oppositely directed stepped end faces to provide seats, and a valve body is rotatably mounted adjacent to the stepped end faces which serve as seats. When required, the valve body is rotated through 90° to bring one end face of the valve body to be seated on one of the stepped end faces (seats) and the other end face of the valve body to be seated on the other stepped end face (seat), thus closing the flow path within the exhaust pipe.

It is noted that in the flow rate control valve of poppet valve type of the prior art as mentioned above, the disposition of the valve body within a gas passage involves a disadvantage that the flow rate of the exhaust gas passing through the gas passage is insufficient.

On the other hand, in the flow rate control valve of butterfly valve type mentioned above, the both stepped end faces which provide seats are formed at locations which are displaced from each other by an amount corresponding to the thickness of the valve body as viewed in the direction of flow of the exhaust gas and are directed in opposite directions.

Accordingly, in the conventional arrangement mentioned above, it is necessary to manufacture the stepped end faces which provide seats with a high accuracy in respect of the position where they are located, and it is also necessary to finish the surfaces of the both stepped end faces which provide seats with a high accuracy.

In addition, in the event a slight displacement occurs in the positions of the both end faces which provide seats, when the valve body is rotated through 90° to close the exhaust pipe in the manner mentioned above, a slight clearance is created between the end of faces of the valve body and the both stepped end faces which serve as valve seats, disadvantageously allowing a leakage of the exhaust gas therethrough.

SUMMARY OF THE INVENTION

In view of the foregoing, the present invention provides a flow rate control valve comprising a cylindrical housing disposed intermediate a gas passage through which an exhaust gas flows, a first cylindrical sleeve fitted into the housing through one axial end of the housing, a second cylindrical sleeve fitted into the housing through the other axial end of the housing, and a valve body in the form of a disc rotatably disposed within the both sleeves, thereby allowing the valve body to open or close the gas passage. In accordance with the present invention, the both sleeves have axes which are displaced from each other in a radial direction and have inner end faces which are disposed in abutment against each other to form a stepped end face inwardly of the both sleeves by part of the inner end faces of the both sleeves to define a first seat by an circumferentially extending edge of the stepped end face, and the valve body has an outer peripheral surface which is formed as a beveled surface or arcuate in section to provide a second seat, the second seat of the valve body being in linear contact with the first seat to allow the gas passage to be closed.

With the described arrangement, the second seat on the valve body is disposed in linear contact with the first seat to close the gas passage, surface pressures on the both seats which are in contact with each other increases, allowing a seal leakage which occurs when the gas passage is closed by the valve body to be reduced as compared with a conventional arrangement mentioned above.

BRIEF DESCRIPTIONS OF THE DRAWINGS

Figure 5:
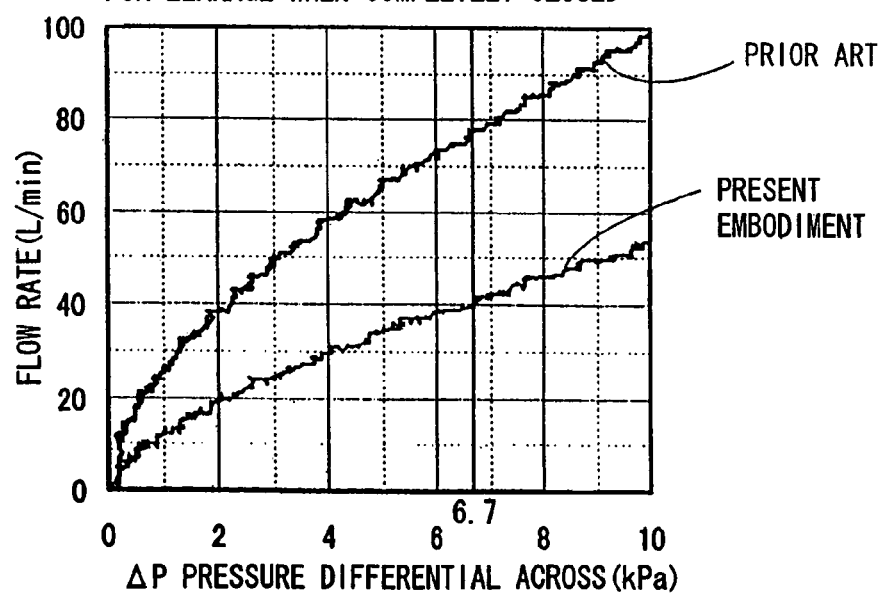
Figure 6:
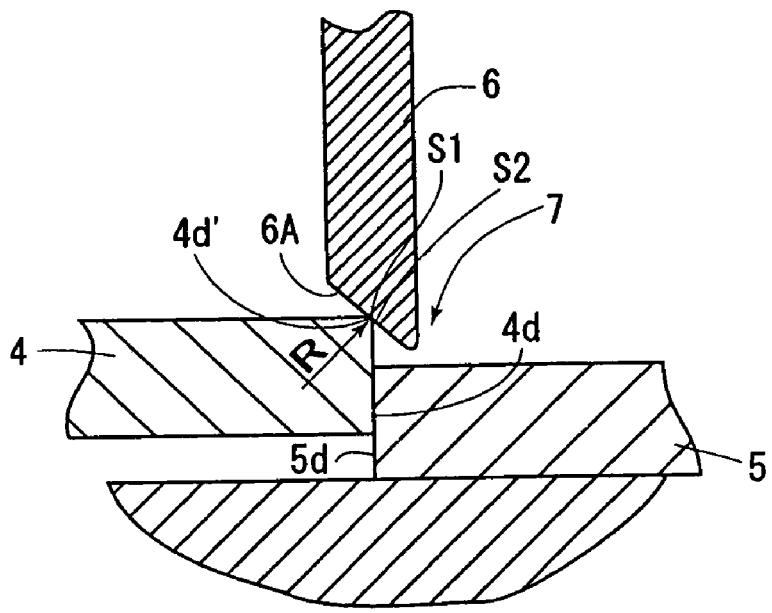
Figure 7:
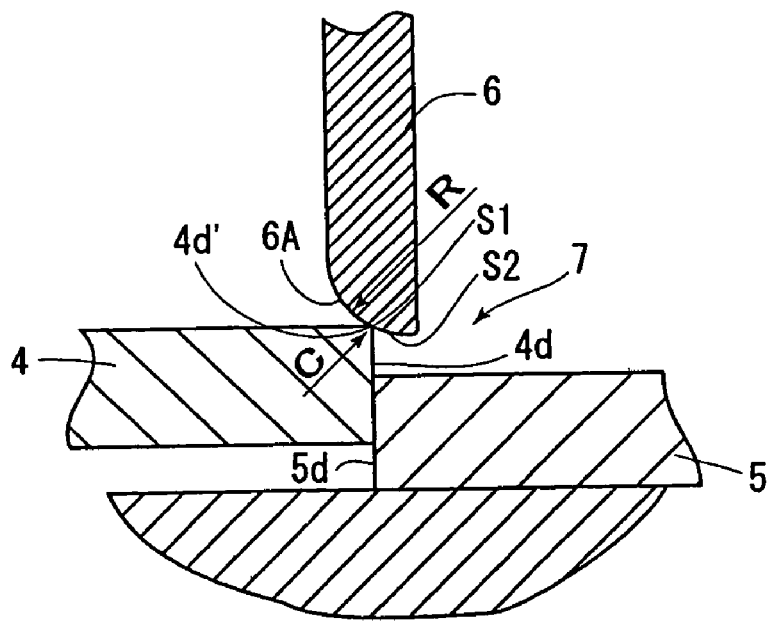
Figure 8:
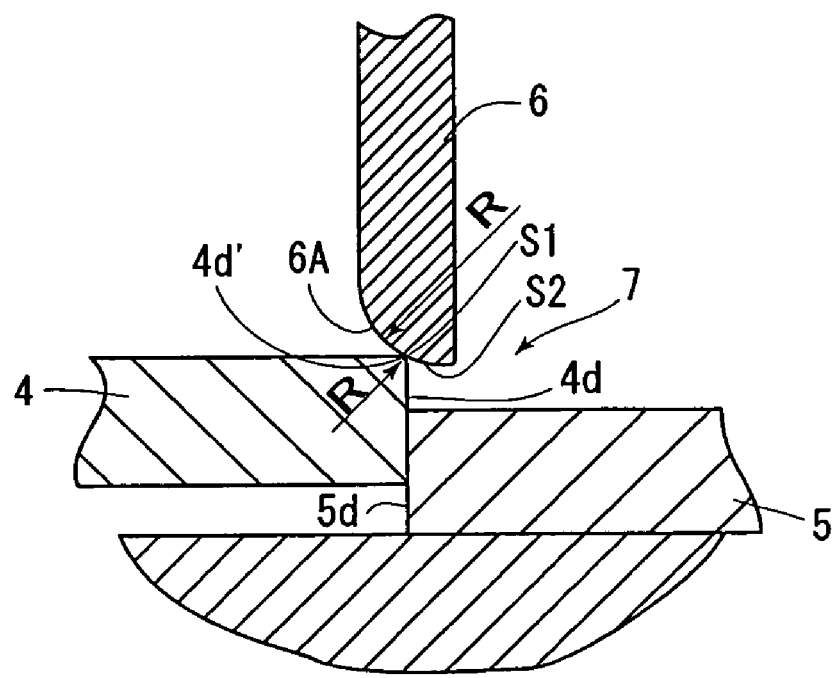

FIG. 5 graphically shows results of an experiment illustrating a seal leakage according to the present invention and according to the prior art;

FIG. 6 is a cross section of another embodiment of a butterfly valve;

FIG. 7 is a cross section of a further embodiment of a butterfly valve;

FIG. 8 is a cross section of still another embodiment of butterfly valve; and

Figure 9:
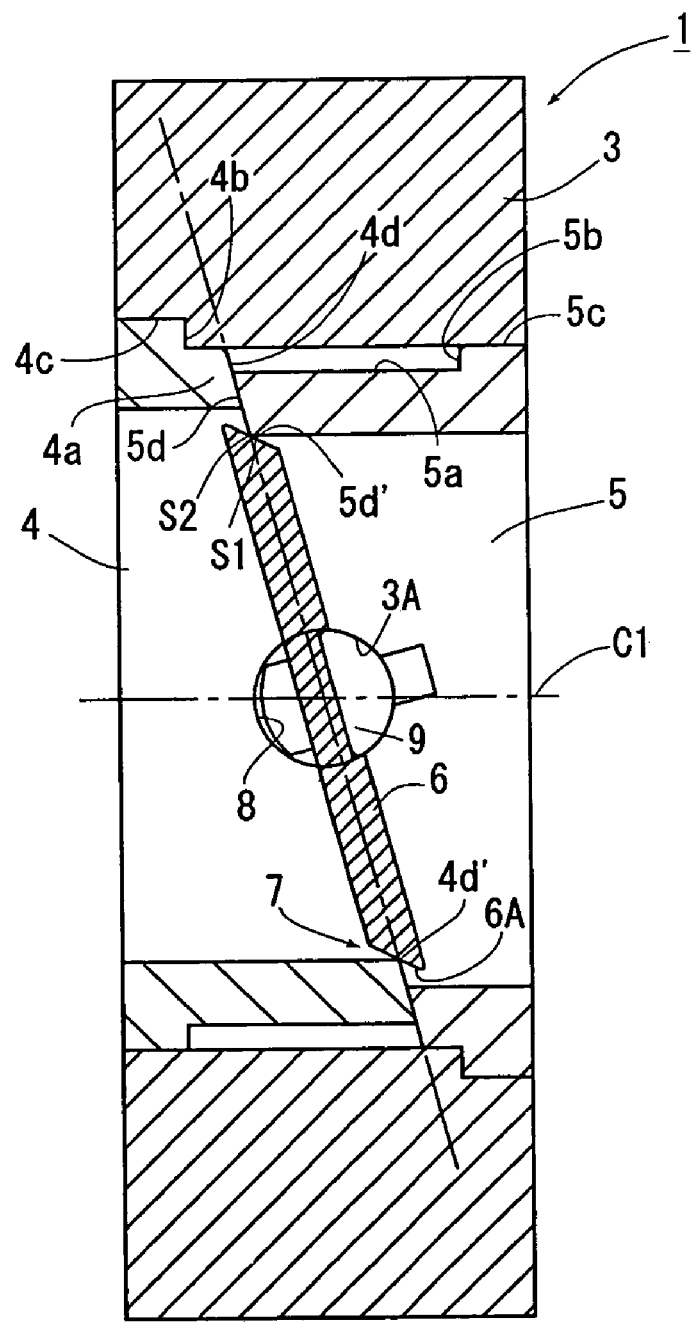

FIG. 9 is a cross section showing yet another embodiment of the present invention.

BEST MODES FOR CARRYING OUT THE INVENTION

Figure 1:
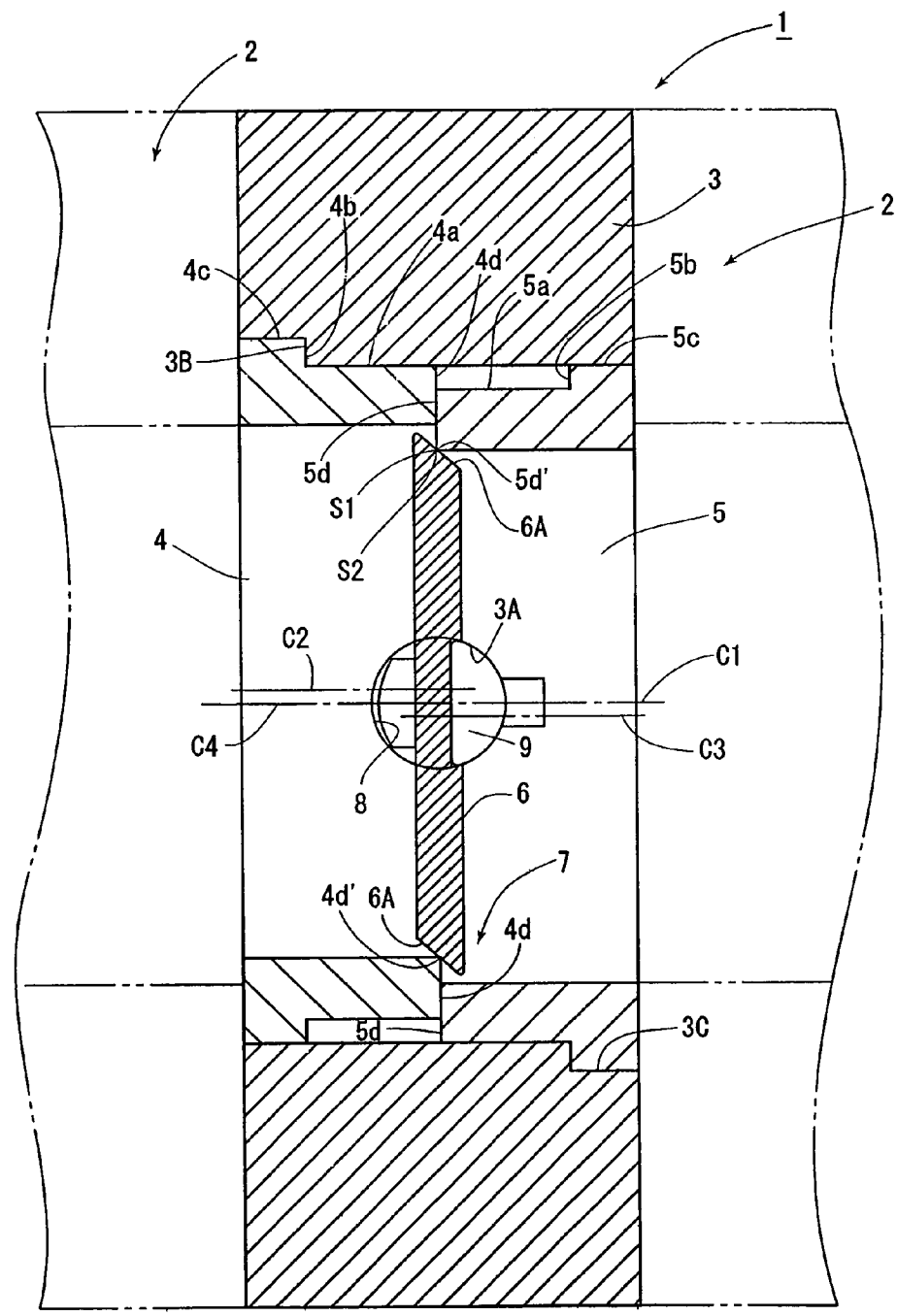
FIG. 1 is a cross section of one embodiment of the present invention.
Figure 2:
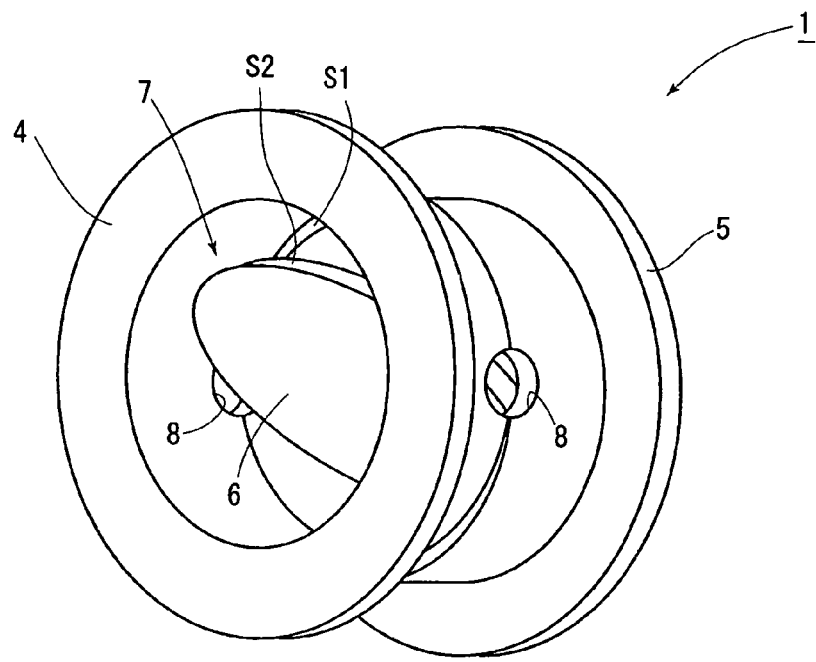
FIG. 2 is a perspective view of an essential part of the flow rate control valve shown in FIG. 1.

Referring to the drawings, several embodiments of the present invention will now be described. In FIGS. 1 and 2, there is shown a flow rate control valve 1 for EGR of an automobile. The flow rate control valve 1 is disposed intermediate a gas passage 2 (pipe) communicating between an air supply pipe and an exhaust pipe, both not shown.

The flow rate control valve 1 comprises a cylindrical housing 3 mounted intermediate the gas passage 2, a first sleeve 4 and a second sleeve 5 which are fitted into the inner periphery of the housing 3 in opposite directions relative to each other, and a disc-shaped valve body 6 disposed inside the both sleeves 4 and 5 and adapted to be rotated forwardly or rearwardly by drive means, not shown, (which may comprise a motor or an air cylinder). A first annular seat S1 defined by the inner end faces of the both sleeves 4 and 5 forms a butterfly valve 7 which opens or closes the gas passes 2 together with a second seat S2 formed by the outer peripheral surface of the valve body 6. The housing 3 is formed of aluminium while the both sleeves 4 and 5 and the valve body 6 are formed of stainless steel which is subjected to a nitrizing treatment to improve an abrasion strength.

The housing 3 is formed in its opposite sides with two through-openings 3A which are located on a common horizontal line in orthogonal relationship with the axis C1 of the housing 3. Horizontal through-openings 8 are formed across the inner ends of the both sleeves 4 and 5 which are fitted into the housing 3 in alignment with the both through-openings 3A in the housing 3.

On the other hand, the opposite sides of the valve body 6 are integrally connected with support shafts 9 which are disposed on a single horizontal line extending through the center thereof, and these left and right support shafts 9 extend through the through-openings 8 and the through-openings 3A in the housing 3. In this manner, the valve body 6 is supported in a rotatable manner within the both sleeves 4 and 5 by means of the left and the right support shaft 9.

The remote end of one of the support shafts 9 is connected to the said drive means, not shown. When this drive means is inoperative, the second seat S2 of the valve element 6 is seated on the first seat S1 to close the butterfly valve 7. When the butterfly valve 7 is closed in this manner to close the gas passage 2, a communication between the air supply pipe and the exhaust pipe, not shown, is interrupted.

By contrast, when the valve body 6 is rotated through 90°, for example, counter-clockwise as viewed in FIG. 1 by the drive means, the valve body 6 is maintained in its horizontal condition which is level with the axis C1 of the housing 3. In this operative condition, the second seat S2 of the valve body 6 is spaced away from the first seat S1 which represents the valve seat, whereby the butterfly valve 7 is opened. Accordingly, the air supply pipe and the air exhaust pipe, both not shown, communicate with each other through the gas passage, whereby the exhaust gas flows from the exhaust pipe toward the air supply pipe. By changing an angle through which the valve body 6 is rotated by the drive means, a flow rate of the exhaust gas which flows through the gas passage 2 can be controlled.

In the present embodiment, the valve body 6 and its associate parts are constructed in a manner described below, enabling a seal leakage of the exhaust gas when the butterfly valve 7 is closed to be significantly reduced.

Specifically, the housing 3 which assumes a cylindrical configuration is formed with an annular recess 3B around its inner periphery at its left end face. The housing 3 is also formed with an annular recess 3C around its inner periphery at its right end face. These annular recesses 3B and 3C have an equal internal diameter and an equal axial size (depth), but the annular recesses 3B and 3C are disposed at locations which are circumferentially displaced from each other by 180°, and their axes are radially offset by a given amount. The first cylindrical sleeve 4 is fitted into the left annular recess 3B while the second cylindrical sleeve 5 is fitted into the right annular recess 3C.

In the present embodiment, the first sleeve 4 and the second sleeve 5 have an identical configuration with an identical size. More specifically, the first sleeve 4 is notched by a given amount around the full circumference at its inner end, thus forming a small diameter portion $4a$, a stepped end face $4b$ and a large diameter portion $4c$. The second sleeve 5 is also notched in the same manner as the first sleeve 4, forming a small diameter portion $5a$, a stepped end face $5b$ and a large diameter portion $5c$. The external diameter of the large diameter portions $4c$ and $5c$ are chosen to be the same as the internal diameter of the both annular recesses 3B and 3C of the housing, and the axial size of the large diameter portions $4c$ and $5c$ is chosen to be equal to the depth (axial size) of the both annular recesses 3B and 3C.

The housing 3 has an axial size which is equal to the sum of the axial sizes of the first sleeve 4 and the second sleeve 5.

The small diameter portion $4a$ of the first sleeve 4 is inserted from the left side into the inner peripheral surface of the housing 3 while the fitting the large diameter $4c$ of the first sleeve 4 into the annular recess 3B while simultaneously disposing the stepped end face $4b$ in abutment against the end face of the annular recess 3B.

Also the second sleeve 5 is inserted from the right side into the inner peripheral surface of the right portion of the housing 3, with its large diameter portion $5c$ fitted into the annular recess 3C while simultaneously disposing the stepped end face $5b$ in abutment against the end face of the annular recess 3C and disposing the inner end face $5d$ of the second sleeve 5 in abutment against the inner end face $4d$ of the first sleeve 4. When the both sleeves 4 and 5 are fitted into the housing 3, the left end face of the housing 3 lies coplanar with the left end face of the first sleeve 4 while the right end face of the housing 3 lies coplanar with the right end face of the second sleeve 5.

Since the annular recesses 3B and 3C of the housing 3 have their axes offset from each other, the both sleeves 4 and 5 are fitted into the housing 3 with their axes radially offset from each other. As a consequence, as shown in FIG. 1, the inner end face $5d$ of the second sleeve 5 is shifted in its upper region downward relative to the inner end face $4d$ of the first sleeve 4 which is disposed in abutment thereagainst, thus forming a stepped end face $5d'$ which is directed to the left. Similarly, a stepped end face $4d'$ which is directed to the right is formed by the inner end face $4d$ of the first sleeve 4 in its lower region. In this manner, the stepped end faces $4d'$ and $5d'$ which are directed in opposite directions are formed and have edges (corners) which are continuous throughout the entire circumference. This edge which is continuous in the circumferential direction defines the first seat S1 (see FIG. 3).

In the present embodiment, the first seat S1 is formed by disposing the inner ends $4d$ and $5d$ of the both sleeves 4 and 5 in abutment against each other while displacing the radial positions, and the first seat S1 lies on a single plane which is perpendicular to the axis C1 of the housing 3 as well as the axes C2 and C3 of the both sleeves 4 and 5.

Figure 4:
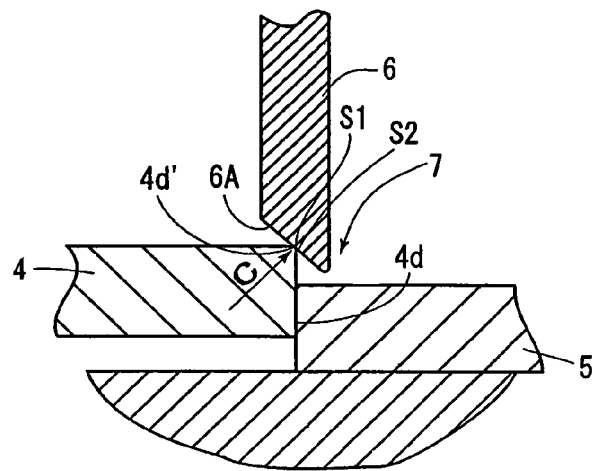
FIG. 4 is an enlarged view of an essential part shown in FIG. 1.

In addition, as shown to an enlarged scale in FIG. 4, in the present embodiment, the edges of the both stepped end faces $4d'$ and $5d'$ which define the first seat S1 are chamfered at an angle of 45°. The butterfly valve 7 is opened or closed by moving the second seat S2 of the valve body 6 into and out of abutment against the first seat S1 constructed in the manner as mentioned above.

The valve body 6 of the present embodiment has an outer peripheral surface 6A which is formed by a beveled surface having an angle of inclination of 45° with respect to the axis C4, and the outer peripheral surface 6A formed by the beveled surface defines the second seat S2.

As mentioned previously, the support shafts 9 are connected to the opposite sides of the valve element 6 of this embodiment in a horizontal plane, and the support shafts are rotatably fitted in the through-openings 3A in the housing 3 and through the through-openings 8 formed in the both sleeves 4 and 5.

The pair of support shafts 9 have a center of rotation which is located on the same vertical plane as the first seat S1 or the inner ends $4d$ and $5d$ of the both sleeves 4 and 5 which are disposed in abutment against each other. In this manner, when the valve body 6 is rotated clockwise by the drive means to cause the second seat S2 to be seated upon the first seat S1 to close the butterfly valve 7, a vertical plane which represents a center position as viewed in the direction of thickness thereof lies in the same vertical plane as the both inner end faces $4d$ and $5d$ (or the first seat S1 and second seat S2).

At this time, the butterfly valve 7 is closed by bringing the second seat S2 of the valve body 6 into linear contact with the first seat S1.

With the described arrangement, when the drive means is inoperative, the second seat S2 of the valve body 6 is in contact with the first seat S1 to close the butterfly valve 7 as shown in FIG. 1. In this closed condition, the second seat S2 of the valve body 6 is in linear contact with the first seat S1, whereby the both seats S1 and S2 assume a high surface pressure, thereby allowing a seal leakage of the exhaust gas through a clearance between the both seats S1 and S2 to be suppressed when the butterfly valve 7 is closed.

FIG. 5 graphically shows results of an experiment for a seal leakage, conducted for the butterfly valve 7 according to the present embodiment and the conventional butterfly valve.

Figure 3:
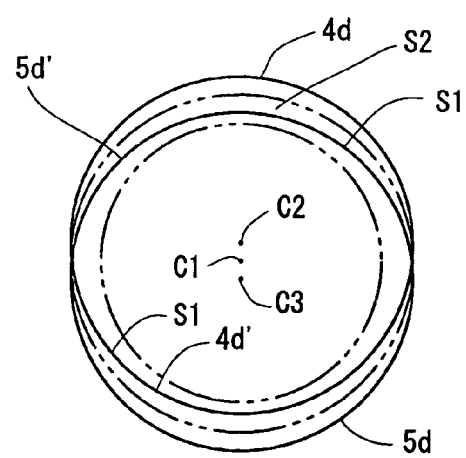
FIG. 3 is an illustration of a relationship between a first seat S1 and a second seat S2 shown in FIG. 1.

A butterfly valve representing the prior art comprises an arrangement including a valve body and both stepped end faces as disclosed in FIG. 3 of Utility Model Application No. 90523/1979 cited above.

As will be understood from the results of experiment as shown in FIG. 5, with the butterfly valve 7 according to the present embodiment, a seal leakage when the butterfly valve 7 is closed is significantly reduced as compared with the prior art. Specifically, comparing the amount of leakage of the exhaust gas across the valve body 6 when there is a differential pressure of 6.7 kPa across the valve body 6 when the butterfly valve 7 is closed, the leakage amounted to 78 L/min according to the prior art while the amount of leakage is 41 L/min, which is nearly one-half, in the present embodiment. This illustrates that the amount of seal leakage of the present embodiment is nearly one-half the amount which occurs in the conventional butterfly valve.

This clearly shows that a good sealing performance can be obtained according to the present embodiment as compared with the prior art.

In the present embodiment, the inner end faces $4d$ and $5d$ of the both sleeves 4 and 5 are disposed in abutment against each other while displacing their positions radially, thereby producing stepped end faces $4d'$ and $5d'$, the edges of which define the first seat S1 acting as the valve seat. As a result of such construction, there is no need of finishing the both inner end faces $4d$ and $5d$ to a high accuracy, and because the first seat S1 is defined by disposing the both inner end faces $4d$ and $5d$ in abutment against each other, there can be provided the butterfly valve 7 which is simple in construction.

In addition, only portions which provide the both seats S1 and S2 can be formed of an appropriate material, and thus there is provided a butterfly valve having a light weight and which is economical.

FIGS. 6 to 8 show other embodiments of the second seat S2 on the valve body 6 and the first seat S1 which provides the valve seat for the butterfly valve 7. In embodiments to be described below, either the first seat S1 or the second seat S2 is shaped arcuate in section or as a tapered surface at an angle of 45°.

Specifically, in FIG. 6, the edge (the first seat S1) of the stepped end face $4d'$ ($5d'$) is arcuate in section while the outer peripheral surface 6A of the valve body 6 is a beveled surface in the similar as in the first embodiment.

In FIG. 7, the first seat S1 is a tapered surface which is chamfered at an angle of 45° while the outer peripheral surface 6A of the valve body 6 (the second seat S2) is chamfered so as to be arcuate in section.

In FIG. 8, both the second seat S2 of the valve body 6 and the first seat S1 are chamfered to be arcuate in section. Embodiments shown in FIGS. 6 to 8 provide a similar functioning and effect as in the first embodiment.

FIG. 9 shows a further embodiment of the present invention.

In the first embodiment, the inner end faces $4d$ and $5d$ of the both sleeves 4 and 5 are disposed to be orthogonal to the axes C1 to C3. However, in the embodiment shown in FIG. 9, the inner end faces $4d$ and $5d$ of the both sleeves 4 and 5 are disposed at a given angle with respect to the axes C2 and C3, and the inner ends $4d$ and $5d$ of the sleeves 4 and 5 which are disposed in this manner are disposed in abutment against each other. Accordingly, in this embodiment, the both inner end faces $4d$ and $5d$ which are disposed in abutment against each other are disposed at a given angle mentioned above with respect of the axis C1 of the housing 3 as are the stepped end faces $4d'$ and $5d'$ while the valve body 6 is constructed in the similar manner as in the first embodiment.

By using such an arrangement, when the butterfly valve 7 shown in FIG. 9 is closed, the valve body 6 assumes a position which is coplanar with the both inner end faces $4d$ and $5d$, and accordingly, the first seat of the valve body 6 is in linear contact with the second seat S2 which provides the valve seat.

The embodiment shown in FIG. 9 is capable of providing similar functioning and effects as in the first embodiment.

While the embodiments mentioned above illustrate the use of the flow rate control valve according to the present invention in EGR, the present invention is also applicable as a flow rate control valve for an exhaust brake unit.

AVAILABILITY IN INDUSTRIAL USE

As described above, according to the present invention, there is obtained an advantage that a seal leakage when the valve body closes the gas passage can be reduced as compared with the prior art.

What is claimed is:

1. A flow rate control valve comprising a cylindrical housing disposed intermediate a gas passage through which an exhaust gas flows, a first cylindrical sleeve fitted into an inner periphery of the housing from one axial end thereof, a second cylindrical sleeve fitted into the inner periphery of the housing from the other axial end, and a valve body in the form of a disc and rotatably disposed within the both sleeves so as to open or close the gas passage;

in which the both sleeves are disposed in a manner such that their axes are offset from each other radially and inner end faces of the both sleeves are disposed in abutment against each other, part of the inner end faces of the both sleeves forming a stepped end face inside the both sleeves, a circumferentially extending edge of the stepped end face defining a first seat, the valve body having an outer peripheral surface which is shaped to be a beveled surface or arcuate in section to define a second seat, the second seat of the valve body being disposed in linear contact with the first seat to close the gas passage.

2. A flow rate control valve according to claim 1 in which the valve body has a center of rotation about which it rotates, the center of rotation being located on a common plane with the mutually abutting inner end faces of the both sleeves.

3. A flow rate control valve according to claim 1 in which each of the inner end faces of both sleeves is a beveled surface which is disposed at a given angle with respect to the axis of either sleeve.

4. A flow rate control valve according to claim 1 in which the first seat is formed as a beveled surface or arcuate in section.

\* \* \* \* \*